Oct. 22, 1968   J. ANDERSON   3,407,377
ELECTRIC CORD SET HAVING A STRESS RELIEVING PLUG
Filed June 29, 1967
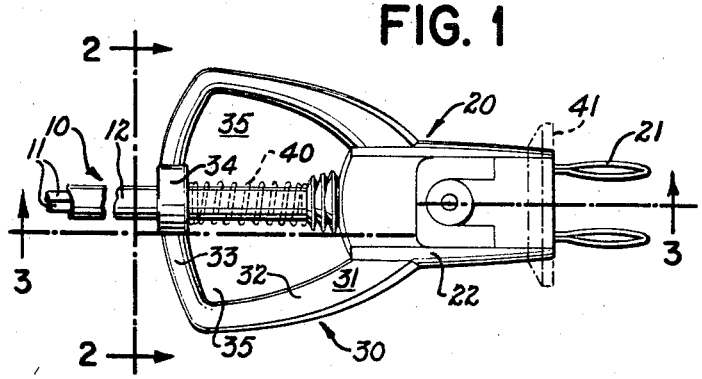
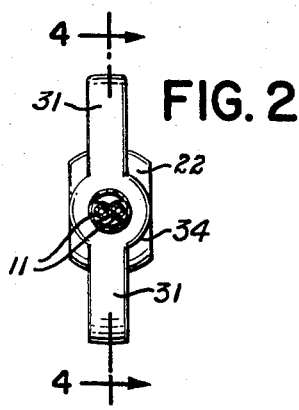
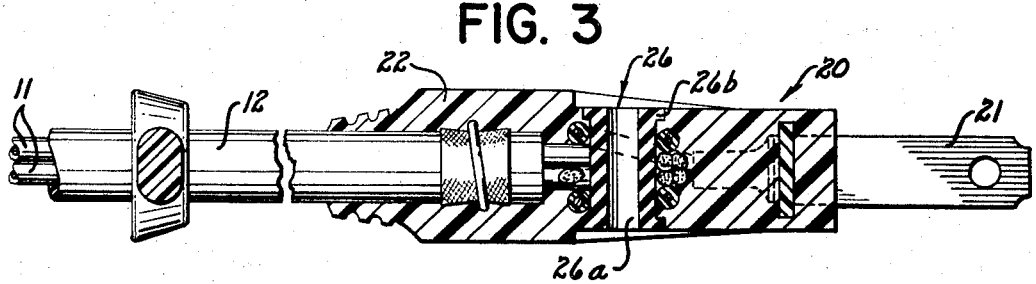
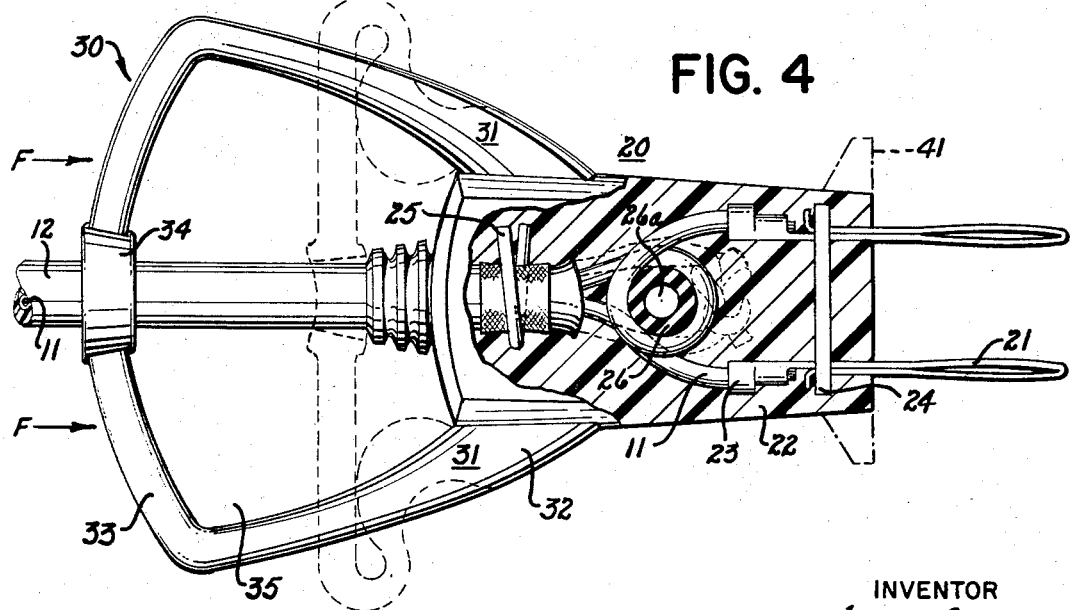
INVENTOR
JAMES ANDERSON
BY *Thomas C. Bitts*
*William H. Henry*
HIS ATTORNEYS

United States Patent Office 3,407,377
Patented Oct. 22, 1968

3,407,377
ELECTRIC CORD SET HAVING A STRESS RELIEVING PLUG
James Anderson, Montreal, Quebec, Canada, assignor to Electrolux Corporation, Old Greenwich, Conn., a corporation of Delaware
Filed June 29, 1967, Ser. No. 649,985
7 Claims. (Cl. 339—105)

ABSTRACT OF THE DISCLOSURE

An electric cord set in which the conductor wires are each wound one turn around a hollow insert or cleat-like member of resilient material such as vinyl plastic material. The insert or cleat is located in the plug body of the cord set adjacent the connection between the conductors of the cord and the terminals of the plug so that any tensile force applied to the cord, or similar force applied to the plug and tending to separate the cord and plug, is relieved by the resilient character of the insert. In effect the insert absorbs or dissipates these forces before the relatively weak joint or connection between the conductors of the cord and the terminals of the plug is damaged by breaking.

A cord set as described above adapted for use with a cordwinder which in addition includes a pair of energy absorbing, deformable arms integral with the plug and defining a collar or annulus which drags on or frictionally engages the jacket of the cord to absorb energy.

Background of the invention

The invention relates to cord sets of the general type shown in U.S. Patents 2,945,921, 3,249,909, 3,296,387 and 3,315,211.

The prior art, evidenced by the foregoing patents, recognizes the problem solved by this invention but the solutions are not as economical as in the present invention. For example, in U.S. Patent 2,945,921 a bumper in the form of a bulbous member having openings at each end must be threaded onto the cord and after the plug is formed by molding the bumper is moved into position adjacent the plug and fixed to the cord by means of a clamping ring. The number of assembly or fabrication operations and handling required in manufacturing the cord set according to this patent is expensive, and the bulbous member has no strain relieving effect when the plug is removed by exerting a pull on the cord. U.S. Patent 3,249,909 disclosed a knot tied in one end in the cord and the knot is molded integral with the plug body so that a tensile stress or force in the cord is transferred to the plug body thereby protecting the fragile connection between the blades of the plug and the conductors of the cord, but the somewhat critical location of the knot, and the knot tying operation is time consuming and therefore uneconomical. A well known metallic strain relief member which is crimped onto the cord or its jacket at one end of the cord prior to molding the plug body is shown in U.S. Patents 3,296,387 and 3,315,211, and while this arrangement is satisfactory, the cord jacket is quite resilient in a longitudinal direction (stretches), and over a period of time it can be elongated so that strains exerted on the cord ultimately reach and rupture the relatively fragile connection between the plug blades and cord set conductors.

Summary of the invention

In accordance with the subject invention a cord set is provided in which strain relief for the connection between the blades of the plug and the conductors of the cord is accomplished by means of a separate tubular member, about which the card conductors are wrapped, consisting of the same material of the plug if the plug consists of a relatively resilient material such as a vinyl plastic, or if the plug is made of a hard material (hard rubber, Bakelite etc.) the insert would consist of a more resilient material, for example vinyl, to provide optimum strain relief in an economical and efficient manner. An element in the plug body secures the ends of the terminals to provide reinforcement. A spring-wire clamp, embedded in the material of the plug body, encircles the cord. Further, an annulus loosely encircles the cord and is held spaced from the body by two cantilever arms to form cord-windup shock-absorbing means.

A primary object of the invention therefore is to provide an improved cord set.

Another object of the invention is to provide strain relief means in a cord set which is inexpensive to manufacture.

A more particular object of the invention is to provide a cord set having a discrete strain relief member consisting of resilient material in the form of a post of relatively soft material which is anchored in the male plug of the cord set and each conductor of the cord is wound one turn about this post.

Another object of the invention is to provide a method of manufacturing a cord set according to the foregoing objects.

Further objects and advantages of the invention will be apparent from the following description of a presently preferred embodiment illustrated in the accompanying drawing.

Brief description of the drawing

FIG. 1 is a plan view of a cord set according to the invention.

FIG. 2 is an end view taken on line 2, 2 of FIG. 1.

FIG. 3 is an enlarged cross-sectional view taken on line 3, 3 of FIG. 1.

FIG. 4 is an enlarged cross-sectional view taken on line 4, 4 of FIG. 2.

Description of preferred embodiments

The cord set illustrated in the drawing comprises a two or three conductor cord generally designated 10 (only two conductors are shown), and a plug generally designated 20. The plug has the usual pair of blades or terminals 21 projecting from the plug body 22 and the conductors 11 of the cord are enclosed in a jacket 12 in the usual manner. The conductors 11 are connected to the blades 21 by means of solder or any suitable solderless or crimp type connectors 23 (FIG. 4). A blade reinforcing member 24 as described in U.S. Patent 3,315,211, is located at the ends of the blades 21 adjacent the connectors 23. A spring wire clamp 25 is shown on the cord jacket at the other end of the plug body and between these parts 24 and 25 the conductors 11 are each wound one turn in opposite directions about the insert 26. The insert 26, as best shown in FIG. 3, has a hollow core 26a and terminates at each end with a radially extending annular flange 26b. The insert 26 which may be thought of as a cleat, consists of a relatively resilient material such as vinyl whereas the material used for molding plug bodies may be less resilient and relatively hard by comparison. As noted hereinbefore the material of the insert 26 and the plug body 22 may both be the same as long as it is relatively resilient i.e. vinyl and the like.

In forming the plug body according to this invention, the conductors 11 are preconnected with the blades 12 and the blade reinforcing member 24 is attached to the blades. If desired the spring wire clamp is also placed on the cord as shown, and this preassembly of parts is placed in a mold cavity of the desired configuration as is well known. The mold cavity may be provided with a pin about which the conductors 11 are wound in the manner illustrated in FIG. 4. Alternatively the conductors may be wound about a separate post before the preassembled parts described above are inserted into the mold. The plug body is then formed by injection molding and when the mold is opened the mold pin is removed leaving an opening in the plug body, or the separate post is knocked out of the molded plug body for this purpose thus leaving the conductors 11 surrounding the opening thereby formed in the plug body. This opening is then closed or filled with the insert 26 as shown in the drawing.

A further alternative to the above described method is to place the insert 26 in the mold directly, and providing, in the open bore of the insert, a rigid rod. When the plug body is formed this rod is removed thereby providing the insert with the required resiliency.

The presently preferred method of manufacturing the plug body is to place a previously molded insert over a pin in the plug body cavity of the mold. The conductors are then wound about the insert as shown in FIG. 4 and the plug body is formed. At the same time a new insert is also formed (family mold) and when the completed plug body, including the previously molded insert is removed, the newly formed insert is placed on the pin in the plug body cavity and the conductors wound about it as before. Thus, each time a finished plug is formed a separate insert is also formed.

In a cord set for light duty, for example a cord set for a lamp, the plug body would require only an insert 26 and the blade reinforcing member 24 and spring wire 25 could be eliminated. A heavy duty cord set for use with a vacuum cleaner having a cordwinder, such as disclosed in U.S. Patents 2,945,921 and 3,296,387 for example, would preferably include the spring wire clamp 25 and a bumper or shock absorber of any type, such as the type disclosed in these two patents or as shown in the drawing and hereinafter described.

Further, a heavy duty cord set may utilize the known filler string of the cord which is tied about the insert 26 as shown in FIGS. 3 and 4 in phantom lines.

A further feature according to this invention is an improved shock absorber bumper or snubber generally designated 30 and best seen in FIGS. 1, 2 and 4 of the drawing. As shown, the snubber 30 is preferably formed integral with the plug body 22 and includes a pair of cantilever arms 31 each of which has a generally horizontal portion 32 anchored at one end to the plug body 22 and a generally vertical portion 33. Intermediate the vertical arm portions 33, an annulus 34 is provided which has an opening for normally, freely receiving the cord 10, in the position shown in full lines in FIG. 4.

In operation, when the male plug is in a wall outlet the snubber 30 provides a convenient finger grip for removing the cord set from the wall outlet. In order to remove the plug a finger is inserted in each opening 35 and the plug is moved by pulling on the arm portions 33. When the cord set is being wound up on the cord reel the snubber 30 functions as a shock absorber as best shown in FIG. 4. As indicated by arrows F, the cordwinder body engages the arm portions 33 pushing them inwardly and thereby deforming the arms 31 as indicated in phantom in FIG. 4. When the arms 31, 33 deform the annulus 34 is also deformed and becomes canted and therefore grips or drags on the jacket 12 of the cord 10. Also, the energy absorbed or dissipated by the drag of annulus 34 on the jacket 12 is supplemented by the energy absorbed in deforming the arms 31, 33 of the snubber 30.

When the cord is wound completely on the cordwinder, and a rest condition exists, the arms 31, 33 will have sufficient potential energy to extend into the normal position shown in full lines in FIG. 4. However, if this potential energy is insufficient or when otherwise desirable, a helical spring may be interposed between the annulus 34 and the plug 22 concentrically surrounding the cord jacket 12 as indicated in phantom at 40 in FIG. 1.

It is noted that it is also contemplated to provide arms 31, 33 solely for the purpose of a finger grip on a cord plug, in which case between the annulus 34 and the opposite end of the plug body, a sleeve (not shown) may be provided. This sleeve may loosely receive the cord 12 or it may tightly engage the corresponding portion of the cord for strengthening the cord adjacent the plug body. The above noted sleeve may be a separate part or it may be formed by molding simultaneously with the plug body 22 and arms 31, 33.

As indicated in phantom at 41 in FIGS. 1 and 4 an annular, radially extending flange may be provided instead of the blade reinforcing member 25, or in addition to member 25. A flange such as 41 will protect the blades if the plug is pulled sideways at an acute angle relative to a wall outlet since the flange acts as a lever increasing the radius of curvature about which the blades can turn thereby preventing excessive bending of the blades. Thus, the plug will, when pulled at an angle from a wall outlet, pivot about the outer peripheral edge of the flange 41 thereby extracting the plug from the outlet with only a small bending force being imposed on the blades which is well within the tolerance of the known blades.

The foregoing description of a presently preferred cord set according to the invention is given by way of example, and it is not intended to thereby limit the appended claims the specific details shown and described.

What is claimed is:

1. A cord set comprising a cord having a plurality of conductors, a plug member having a plurality of terminals, a plurality of connector means for electrically coupling said conductors and said plug terminals, and discrete resilient insert means supported in said plug member; each of said conductors being wound one turn of substantially 360° around said insert means, said insert means being located adjacent said connector means and remote from said terminals.

2. A cord set according to claim 1 with the addition of terminals reinforcing means connected with the ends of said blades within said plug member.

3. A cord set according to claim 2 with the addition of a spring-wire clamp attached to said cord within said plug member on the side of said insert means remote from said terminals, said plug member having a molded body in which said terminal reinforcing means and said spring wire clamp are embedded.

4. A cord set according to claim 1 with the addition of shock absorbing means coupled with said molded body and adapted to engage a fixed object for decelerating said cord set when reeled up on a cordwinder.

5. A cord set according to claim 4 wherein said shock absorbing means comprises a pair of cantilever, curvilinear arms having substantially horizontal and vertical portions, and an annulus intermediate said vertical portions concentrically surrounding said cord.

6. A cord set according to claim 1 wherein said insert means comprises a hollow cylindrical member.

7. A cord set according to claim 6 wherein said hollow cylindrical member is constituted of vinyl plastic material and said plug member is constituted of vinyl plastic material.

References Cited
UNITED STATES PATENTS

| | | | |
|---|---|---|---|
| 2,209,814 | 7/1940 | Finger | 339—105 X |
| 3,249,909 | 5/1966 | Kowalewski | 339—105 |
| 3,315,211 | 4/1967 | Weeks | 339—63 |

FOREIGN PATENTS

| | | |
|---|---|---|
| 461,051 | 11/1949 | Canada. |
| 538,240 | 3/1922 | France. |

RICHARD E. MOORE, *Primary Examiner.*